(No Model.)
C. H. SCOTT.
MULTIPLE DRILLING MACHINE.
No. 469,600. Patented Feb. 23, 1892.
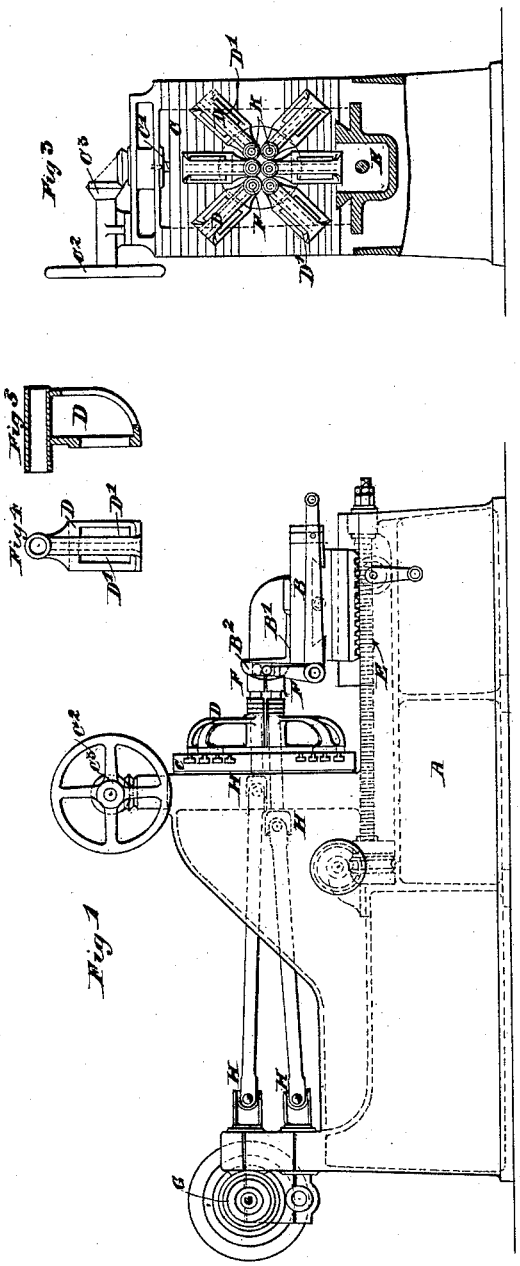
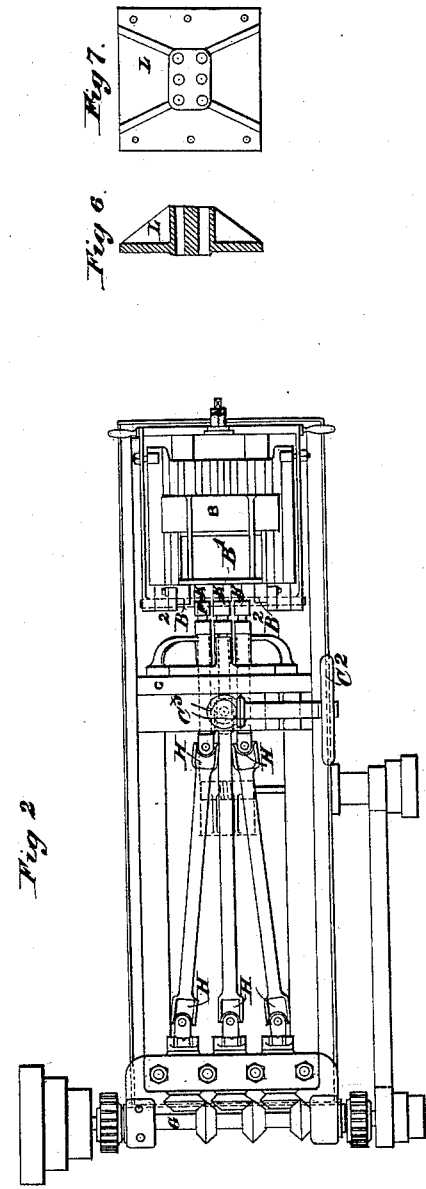
Witnesses:
Inventor:

UNITED STATES PATENT OFFICE.

CHARLES HERBERT SCOTT, OF GLOUCESTER, ENGLAND.

MULTIPLE DRILLING-MACHINE.

SPECIFICATION forming part of Letters Patent No. 469,600, dated February 23, 1892.

Application filed November 10, 1891. Serial No. 411,507. (No model.) Patented in England August 29, 1890, No. 13,607.

*To all whom it may concern:*

Be it known that I, CHARLES HERBERT SCOTT, a subject of the Queen of Great Britain and Ireland, residing at High Orchard Iron Works, Gloucester, England, have invented Improvements in Multiple Drilling-Machines, (the same having been patented in Great Britain August 29, 1890, and numbered 13,607,) of which the following is a specification.

The object of this invention is to enable a multiple drilling-machine to be readily adapted to drill holes at different distances apart, according to requirement from time to time—as, for example, when it is desired to drill sometimes at one distance apart and sometimes at another holes in short pieces of angle-iron. For this purpose flexible couplings or universal joints, such as Hooke's double joints or flexible shafts, are interposed between the driving-gear and the drill holders or sockets, to which therefore rotary motion is imparted through the said joints or shafts, and the spindles or parts in which the said sockets are formed are arranged to work in holes or bearings formed in a removable plate or bosses adapted to be readily secured to and removed from a fixed face-plate of the machine, and which removable plate or bosses guides or guide and takes or take the pressure of the drills. The work to be drilled is fixed to a movable table or rest arranged in front of the drills and provided with a suitable feed-motion. When it is desired to alter the distances apart of the drills to suit fresh work, this can be effected when using plates each having in it several holes or bearings by attaching a new plate to take the thrust of the drill-sockets, this plate being provided with holes or bearings having their centers arranged to suit the new work to be done, or if according to the modification above referred to each drill has a separate plate or boss through which the drill-spindle works. These plates or bosses are bolted or otherwise attached to a fixed face-plate in such a manner that their positions, and consequently the positions of the centers of the drill, can be varied as required. The use for driving the respective drill-spindles of universal joints, such as Hooke's double joints or flexible shafts, as described, enables the necessary allowance to be made for variations in the distances apart of the centers of the drills.

In the accompanying drawings, Figures 1, 2, and 3 are respectively a side elevation, a plan, and a transverse section of a multiple drilling-machine constructed according to this invention. Figs. 4 to 7, inclusive, are detail views hereinafter referred to.

A is the frame of the machine, provided with a rest B for carrying the object to be drilled, which in the example shown is an angle-iron knee B'. This rest is capable of adjustment transversely to the machine for the purpose of setting the work, and is fed up to the drills in the ordinary manner by any suitable means—as, for example, by the feed-screw E.

The frame A of the machine shown in Figs. 1, 2, and 3 carries a face-plate C, which may advantageously be made adjustable in a vertical direction. It may be by a vertical screw C', operated by a hand-wheel $C^2$ and bevel-gearing $C^3$. To the face-plate are attached suitable bosses or brackets D D, which carry the drill-holders F F, which may either be sockets to receive the shanks of the drills, or may be spindles adapted to fit into sockets in the drill-shanks. One of these brackets is shown separately in end elevation and central section in Figs. 4 and 5, respectively. The spindles or parts in which the drill-sockets F are formed are each prolonged backward through an opening in the face-plate C, and are connected to and driven from the driving mechanism at G by means of universal joints—as, for example, Hooke's joints—as shown at H H, or, if preferred, by flexible shafts. By these arrangements the bosses or brackets D D, in which revolve the spindles or parts of the drill-holders F F carrying the drills K K, can be moved and set by means of a templet or other suitable means to the position required for the work to be done, and can then be clamped to the face-plate C by suitable means, such as by bolts that extend through slots D' in the bosses or brackets and are provided with nuts. The objects to be drilled being placed in succession on the rest B, which is provided with suitable clamps $B^2$ to hold them, can then be drilled so as to be interchangeable in the same manner as if drilled through a templet, as is ordinarily done.

If desired, the face-plate C and bosses or brackets D D can be made in one piece, as is shown at L in Figs. 6 and 7, which are respectively a cross-section and an end elevation. This arrangement is suitable for cases in which a great number of similar pieces of work are to be operated on. Where objects of large size are to be operated on or for other reasons, the part of the frame A carrying the drills K and all the gear connected to and driving them can be arranged to slide on the lower part or bed of the machine and be fed up to the work to be operated on by a feed-screw or by other suitable means, the rest B carrying the work to be operated on being in this case stationary. This modification, which is obviously more suitable for use where large heavy pieces, such as long girders, have to be drilled, will be readily understood without a drawing.

What I claim is—

1. A multiple drilling-machine having drill-holders mounted to rotate in removable bosses or brackets and means for rotating said drills, substantially as described.

2. A multiple drilling-machine having drill-holders mounted in adjustable bosses or brackets and connected by flexible couplings with rotary driving mechanism, substantially as described.

3. In a multiple drilling-machine, the combination of a transversely and longitudinally adjustable rest B, a vertically-adjustable face-plate C, adjustable brackets D, mounted on said face-plate, drill-holders F, arranged to rotate in said brackets, and means for rotating said drill-holders, substantially as described.

4. In a multiple drilling-machine, the combination of an adjustable rest B, a vertically-adjustable face-plate C, independently-adjustable brackets D, drill-holders F, universal couplings H and shafts connecting them, and driving mechanism G, the whole arranged and operating substantially as described.

In testimony whereof I have signed my name to this specification in the presence of two subscribing witnesses.

CHARLES HERBERT SCOTT.

Witnesses:
ERNEST J. W. SMITH,
*Wellington Villas, Archibald St., Gloucester.*
G. G. BAKER,
*16 New Street, Gloucester.*